Patented Feb. 17, 1948

2,436,125

UNITED STATES PATENT OFFICE 2,436,125

SILICA-ZIRCONIA CATALYSTS AND
METHOD OF PREPARATION

Le Roy U. Spence, Elkins Park, and Darrel J. Butterbaugh, Abington, Pa., and Donald G. Kundiger, San Francisco, Calif., assignors to Röhm & Haas Company, Philadelphia, Pa., a corporation of Delaware No Drawing. Original application August 30, 1944, Serial No. 551,988. Divided and this application June 25, 1946, Serial No. 679,278

6 Claims. (Cl. 252—204)

This invention relates to the production of catalysts which are particularly suitable in the conversion of ethanol to butadiene at elevated temperatures. The catalysts comprise alkali-digested mixtures of zirconium oxide or thorium oxide, or both, with silica. This application is a division of our application Serial No. 551,988, filed August 30, 1944, allowed September 8, 1947.

Our new catalysts convert ethanol or mixtures of ethanol and acetaldehyde into butadiene in good yields under the conditions set forth below. Crotonaldehyde or acetaldol may be substituted for the acetaldehyde with good results. The ethanol or mixture of ethanol and aldehyde and/or aldol is vaporized and passed over the catalyst in a heated tube at temperatures within the range of from about 375° to about 525° C. and at pressures from above normal to well below normal. The exit gases are cooled to about 0° C. to condense out water, alcohol, acetaldehyde, crotonaldehyde, and other liquid by-products. Alternatively, these substances may be removed by scrubbing the exit gases with water. The gaseous products contain the butadiene with small amounts of impurities, such as butylenes, ethylene, and hydrogen. The butadiene may be recovered from the gases by absorption in solvents, preferably under pressure, or by other known methods of recovery and purification. The unchanged alcohol, acetaldehyde, and/or crotonaldehyde are preferably recovered from the condensed liquids by distillation and are returned over the catalyst for conversion to butadiene. The ethanol used may contain some water, 90% to 95% of ethanol giving good results. The presence of larger amounts of water in the ethanol has little effect upon the yield of butadiene, but does reduce the rate of reaction. Mixtures of acetaldehyde and ethanol give improved yields of butadiene in mixtures containing up to about fifty mol per cent acetaldehyde, with an optimum yield at about thirty mol per cent acetaldehyde. When such mixtures are used, the rate of reaction is higher than with ethanol alone. The concentration of butadiene in the exit gases is also higher when mixtures of acetaldehyde and ethanol are employed, since less hydrogen is formed. Crotonaldehyde or acetaldol may also be mixed with the ethanol and passed over the catalyst to give good yields of butadiene. A concentration of fifteen to thirty mol per cent crotonaldehyde or acetaldol in the ethanol gives highly satisfactory yields.

Our catalysts comprise the alkali-digested mixtures of zirconium oxide or thorium oxide, or both, with silica. The silica may be in the precipitated form or as diatomaceous earth. Mixtures which are not digested with strong alkali do not serve as catalysts for the production of butadiene in commercially attractive yields. The alkali-digested mixtures of this invention produce yields of a high order. They may be made by heating said mixtures with solutions of strongly alkaline bases such as lithium hydroxide, sodium hydroxide, potassium hydroxide, or quaternary ammonium hydroxides such as benzyl trimethyl ammonium hydroxide. Alternatively, the alkali metal silicates, such as sodium silicate, may be used for the digestion. The silicates serve also as a source of silica. The activation may preferably be performed by digesting the admixture with an aqueous solution containing about 0.1% to about 8% of a strongly alkaline material. This operation may be carried out at 50° C. or more, at such concentrations, and is conveniently done by refluxing of the alkaline solution containing the oxides but may be done under pressure. With concentrations of alkali above the preferred range, even lower temperatures may be used. In effecting activation of the catalyst as above described, the factors of time, temperature, and concentration of alkaline material are so controlled that the catalyst produced will efficiently function in the conversion reaction for which it is subsequently to be used.

The diatomaceous earth used is preferably in finely divided form, acid washed to remove iron oxide, and then ignited.

Zirconium oxide and thorium oxide, prepared by precipitation from soluble salts or by ignition of the nitrates or chlorides, when used alone or mixed with diatomaceous earth or precipitated silica, chiefly cause decomposition of ethanol to ethylene and give inconsequential yields of butadiene. Diatomaceous earth or precipitated silica by itself is substantially inert to ethanol at the temperatures at which our catalysts give optimum yields.

Heating zirconia and/or thoria with strong bases in the presence of precipitated silica or diatomaceous earth gives a catalyst which represses formation of ethylene from ethanol. Heating precipitated zirconium dioxide or thorium oxide with a sodium silicate solution gives a similar result. Treatments of this type apparently convert such oxides into some form of silicate or into a mixture of oxide and silicate. Such change in the composition of the catalyst may be responsible for the depression of the dehydration to ethylene and the marked increase in the yield of butadiene when our catalysts are employed as herein described.

In the preparation of these catalysts, zirconium and/or thorium oxide or the hydrated oxides are mixed with silica or formed in the presence of silica. While wide variations in the proportions of metal oxide, $MO_2$, to silica, $SiO_2$, may be utilized, the preferred proportions of $MO_2$ to $SiO_2$, on a weight basis, fall within the range of 1 to 9 and 4 to 1. The most economical proportions, on a weight basis, with respect to both cost of catalyst and conversion to a desired product are 1 to 4 to 1 to 1.

Other substances may be added to our catalysts to serve as promoters. Particularly suited for this purpose are magnesium oxide, manganese oxide, copper oxide, molybdenum oxide, and cobalt oxide. These serve to increase the rate of reaction. Such substances may be added before or after the alkali digestion, but in most cases it is preferable to add them before heating with the alkali.

The oxides of zirconium and thorium are preferably precipitated from aqueous solutions of their soluble salts containing the diatomaceous earth in suspension. Particularly good results are obtained when the soluble salts are chlorides or nitrates, although other soluble salts such as the sulfates may be used. Solutions of such salts up to 0.5 molar are suitable. The oxides may also be precipitated, washed with water, and then mixed with the diatomaceous earth. It is not necessary, however, to wash the precipitated catalyst to remove soluble salts before proceeding with the alkali digestion. Sodium or potassium silicate may be used for precipitating the zirconia or thoria, in which case precipitated silica is formed at the same time. The same alkali may be used for the precipitation and the digestion. Excess alkali may be added during the precipitation step. An excess of 25% to 200% of the alkali required for the precipitation has been found to be effective in the digestion step, the optimum amount varying with the ratio of silica to the dehydrating oxide in the catalyst. The digestion may be carried out by heating the admixture in suspension at a temperature of from about 60° to 125° C., using pressure if desired, the optimum temperature depending upon the concentration of the alkaline solution and the time of digestion. The most useful range generally is 90° to about 100° C. for times of one to two hours at concentrations of alkaline solution from about 0.1% up to about 8%. The solution may be somewhat concentrated by evaporation during the digestion, but it is preferred not to evaporate to dryness. After the digestion, the excess alkali and soluble salts are washed out of the precipitate by decantation or filtration. The excess alkali may be partially neutralized to aid in filtration if desired, but the pH of the solution should not be brought below 9 by acidification or the effect of the digestion will be lost. Washing is continued until the wash water is almost neutral (pH 8 to 9) so that essentially all of the alkali is removed from the catalyst.

The precipitate is then dried at temperatures of from about 100° to about 150° C. to remove most of the water, and is then broken up into pieces of suitable size, preferably four to eight mesh, although the mesh size may vary over a relatively wide range.

The catalyst may also be formed in suitable shapes, as, for example, by extrusion of a wet paste before drying. Water left in the catalyst is removed by heating to a temperature of the order of from 350° to 400° C. in a stream of air before use.

These catalysts retain their activity for several days of continuous use. Over extended periods of use, they gradually become covered with a carbonaceous deposit which reduces their activity. The activity of the catalyst can be substantially completely restored, however, by burning off the carbonaceous deposit at temperatures of from 400° to 600° C.

Preparation of catalysts within the scope of our invention is described in the following illustrative examples.

*Example 1*

In a solution of 0.162 mol of zirconyl chloride in one liter of water, there was suspended 75 grams of a finely divided, acid-washed and ignited diatomaceous earth. 0.648 mol (100 per cent excess) of sodium hydroxide in 500 cc. of water was added thereto, and the mixture was digested for two hours at 90°–95° C. Water lost by evaporation was replaced. The digested mixture was then cooled and filtered and the filter cake washed three times with one liter of water. After drying at 100° C., the cake was broken up into 4–8 mesh particles and ignited at 425° C.

*Example 2*

To a solution of 0.162 mol of zirconyl chloride in one liter of water, there was added 0.648 mol (100 per cent excess) of sodium hydroxide in 400 cc. of water. The precipitated zirconium hydroxide was digested for two hours at 90°–95° C. and then cooled. The cooled suspension was vigorously stirred and 75 grams of a finely divided, acid-washed and ignited diatomaceous earth was added thereto. The mixture was filtered immediately, the filter cake washed three times with one liter of water, dried at 100° C., and finally broken up into 4–8 mesh particles and ignited at 425° C.

*Example 3*

To a mixture of 0.488 mol of zirconyl chloride, 75 grams of a finely divided, acid-washed and ignited diatomaceous earth, and one liter of water, there was added with stirring 1.22 mols (25 per cent excess) of sodium hydroxide in 400 cc. of water. The mixture was digested for two hours at 90° C. to 95° C., then cooled and filtered. The filter cake was washed three times with one liter of water and, after drying at 100° C., the cake was broken up into 4–8 mesh particles and ignited at 425° C.

*Example 4*

To a solution of 0.162 mol of zirconyl chloride in one liter of water, there was added 0.324 mol (theoretical amount) of sodium hydroxide in 400 cc. of water. There resulted a precipitated suspension to which was added 55.5 grams of sodium silicate containing 0.257 mol of silicon dioxide and 0.306 mol of sodium hydroxide. This mixture was digested for two hours at 90–95° C. Water lost by evaporation was replaced. After digestion, the suspension was cooled to 35°–40° C. and thoroughly stirred, whereupon 75 grams of a finely divided, acid-washed and ignited diatomaceous earth was added thereto. The resulting mixture was filtered immediately and the cake washed three times with one liter of water, then dried at 100° C. and broken into 4–8 mesh particles, and finally ignited at 425° C.

Example 5

A solution of 0.324 mol of zirconyl chloride in two liters of water was prepared. To this was added 0.648 mol (theoretical quantity) of sodium hydroxide in 400 cc. of water. After thoroughly mixing the resulting suspension, a sodium silicate solution containing 0.67 mol of silicon dioxide and 0.606 mol of sodium hydroxide was added, and the suspended zirconium hydroxide was then digested for two hours at 90°–95° C. The mixture was thereafter cooled and filtered. A second batch was prepared in the same way and combined with the first batch during the first filtration. The combined cake was washed three times with two liters of water, dried at 100° C., broken up into 4–8 mesh particles, and finally ignited at 425° C.

Example 6

To a mixture of 0.162 mol of zirconyl chloride, 75 grams of a finely divided acid-washed and ignited diatomaceous earth, and one liter of water, there was added 0.972 mol (200 per cent excess) of trimethyl benzyl ammonium hydroxide in 500 cc. of water. The mixture was digested for two hours at 90°–95° C., then cooled and filtered. The filter cake was washed three times with one liter of water, dried at 100° C., broken up into 4–8 mesh particles, and ignited at 425° C.

Example 7

To a mixture of 0.144 mol of zirconyl chloride, 75 grams of a finely divided, acid-washed and ignited diatomaceous earth, and one liter of water, there was added gradually, while the mixture was being stirred, a solution of 0.576 mol of sodium hydroxide and 0.032 mol of molybdenum trioxide (as ammonium molybdate) in 500 cc. of water. The mixture was digested for two hours at 90°–95° C., then cooled and filtered. The filter cake was washed four times with one liter of water, dried at 100° C., broken up into 4–8 mesh particles, and finally ignited at 425° C.

Example 8

A mixture of 0.162 mol of zirconyl chloride, 0.040 mol of thorium nitrate, 75 grams of a finely divided, acid-washed and ignited diatomaceous earth, and one liter of water was prepared. To this was added 0.968 mol (100 per cent excess) of sodium hydroxide in 400 cc. of water. The mixture was digested for two hours at 90°–95° C., then cooled and filtered. The filter cake was washed three times with one liter of water, dried at 100° C., broken up into 4–8 mesh particles, and ignited at 425° C.

Example 9

A mixture of 0.162 mol of zirconyl chloride, 0.162 mol of magnesium nitrate, 75 grams of a finely divided, acid-washed and ignited diatomaceous earth, and one liter of water was prepared. To this was added 0.972 mol (33 per cent excess) of sodium hydroxide in 400 cc. of water. The mixture was digested for two hours at 90°–95° C., then cooled and filtered. The filter cake was washed three times with one liter of water, dried at 100° C., broken up into 4–8 mesh particles, and finally ignited at 425° C.

Example 10

To a mixture of 0.488 mol of zirconyl chloride, 75 grams of a finely divided, acid-washed and ignited diatomaceous earth, and one liter of water, there was added 1.95 mols of sodium hydroxide in 500 cc. of water. The mixture was digested for two hours at 90°–95° C., then cooled and filtered. The filter cake was washed three times with one liter of water and then neutralized with 0.069 mol of hydrochloric acid to a pH of 8. After one more wash with one liter of water, the cake was dried, broken up into 4–8 mesh particles, and ignited at 425° C.

Example 11

The catalyst prepared in accordance with Example 10 was tested for activity by using it in a normal run with ethanol. The used catalyst was reactivated with air. To 57.4 grams of this reactivated catalyst, containing approximately 0.208 mol of zirconium oxide, was added 0.004 mol of copper nitrate in 100 cc. of water. The mixture was evaporated to dryness and ignited at 425° C.

Example 12

To a mixture of 0.076 mol of thorium nitrate, 75 grams of a finely divided, acid-washed and ignited diatomaceous earth, and one liter of water, there was added 0.606 mol (100 per cent excess) of sodium hydroxide in 400 cc. of water. The mixture was digested for two hours at 90°–95° C., and the water lost by evaporation was replaced. After digester, the mixture was cooled and filtered. The filter cake was washed three times with one liter of water, dried at 100° C., broken into 4–8 mesh particles, and ignited at 425° C.

The catalysts prepared as above noted were used in the production of butadiene as follows: One hundred cc. of the catalyst was placed in a Pyrex tube and heated in an electric tube furnace. The temperature was measured with a thermocouple in the center of the catalyst zone. The charge of alcohol was 125 cc. (2 mols $C_2H_5OH$). This was added to the pot of a distilling column and was distilled through the column at a constant rate. The vapors were passed over the catalyst. The water, unchanged alcohol, acetaldehyde, and other liquid products of the reaction were condensed out and returned to the still. The gaseous products were passed into dry ice-cooled traps (−60° to −70° C.) and were then scrubbed with alcohol at −60° to −70° C. The dry ice traps removed some uncondensed acetaldehyde and the major part of the butadiene and butylene, the remainder of the latter two being collected in an alcohol scrubber. The undissolved gases were mainly hydrogen and ethylene with small amounts of carbon dioxide and saturated hydrocarbons. The undissolved gases were measured and analyzed.

The unreacted alcohol and the acetaldehyde returned to the still were fractionated from the water and high-boiling by-products and were returned over the catalyst. Recycling was continued until most of the alcohol had been used up.

The alcohol remaining at the end of the run was determined and deducted from the original charge to calculate the alcohol used up. The butadiene and butene were distilled from the traps and alcohol scrubber through a weighed maleic anhydride scrubber. Unabsorbed gases were condensed and distilled through the maleic anhydride several times until no further increase in weight of the maleic scrubber was obtained. The weight absorbed by maleic anhydride is the butadiene produced, and the weight of unabsorbed condensable gas left is butylene. The acetaldehyde in the still and in the dry ice traps was also retrieved. The yields of butadiene are given in the table below as per cent of theory based on the alcohol decomposed.

In some of the runs, the alcohol was fed independently from a constant rate feeder and vaporized into the top of the catalyst tube. In some of these runs, there was no recycling, and in others the unchanged alcohol and acetaldehyde were recycled. In other runs, mixtures of acetaldehyde and ethanol or crotonaldehyde and ethanol or ethanol and water were fed into the catalyst tube.

Results are noted in the following table:

*Examples of preparation of butadiene*
[Catalyst Composition—Per Cent by Weight]

| Run | Catalyst from Example | Zirconium Dioxide | Thorium Dioxide | Magnesium Oxide | Silicon Dioxide | Molybdenum Trioxide | Copper | Diatomaceous Earth | Method of Catalyst Preparation | Temperature, °C. | Hours Run | Per Cent Yield of Butadiene |
|---|---|---|---|---|---|---|---|---|---|---|---|---|
| 1 | 1 | 21.0 | | | | | | 79.0 | Digestion with NaOH | 455 | 0.90 | 44.1 |
| 2 | 2 | 21.0 | | | | | | 79.0 | Diatomaceous earth added after digestion. | 432 | 1.63 | 23.2 |
| 3 | 3 | 44.5 | | | | | | 55.5 | Digestion with NaOH | 445 | 1.68 | 42.4 |
| 4 | 4 | 18.2 | | | 13.9 | | | 67.9 | Digestion with Na₂SiO₃ | 452 | 4.10 | 40.0 |
| 5 | 5 | 50.0 | | | 50.0 | | | 0.0 | ...do... | 440 | 1.43 | 39.9 |
| 6 | 6 | 21.0 | | | | | | 79.0 | Digestion with trimethyl benzyl ammonium hydroxide. | 445 | 0.60 | 36.2 |
| 7 | 7 | 18.4 | | | | 3.9 | | 77.7 | Digestion with NaOH | 445 | 1.89 | 34.8 |
| 8 | 8 | 19.0 | 10.0 | | | | | 71.0 | ...do... | 445 | 2.10 | 39.3 |
| 9 | 9 | 19.7 | | 6.5 | | | | 73.8 | ...do... | 455 | 1.98 | 43.0 |
| 10 | 10 | 44.5 | | | | | | 55.5 | ...do... | 450 | 1.22 | ¹40.2 |
| 11 | 11 | 44.3 | | | | | 0.4 | 55.3 | ...do... | 460 | 0.85 | ¹40.0 |
| 12 | 12 | | 21.1 | | | | | 78.9 | ...do... | 445 | 2.03 | 38.3 |

¹ Although the yields shown in runs 10 and 11 are essentially the same, the production rate in run 11, containing the copper promoter, was approximately 50% greater than the rate of run 10.

From the above table, it will be noted that relatively high yields of butadiene may be produced by the catalytic conversion of ethyl alcohol when catalysts prepared as above described are employed.

We claim:

1. A catalyst suitable for converting ethanol to butadiene which consists essentially of a mixture of silica and an oxide from the group consisting of zirconium and thorium oxides, said mixture containing from 20% to 90% silica and having been (a) digested at a temperature of at least 50° C. in an aqueous solution of a strongly alkaline material from the group consisting of quaternary ammonium bases, the hydroxides of the alkali metals and the silicates of the alkali metals, (b) freed of water-soluble materials, (c) brought to a pH of 8 to 9, and (d) dried.

2. A catalyst suitable for converting ethanol to butadiene which consists essentially of a mixture of silica and zirconium oxide, said mixture containing 20% to 50% zirconium oxide and having been (a) digested at a temperature of 60° C. to 125° C. in an aqueous solution of a strongly alkaline material from the group consisting of quaternary ammonium bases, the hydroxides of the alkali metals and the silicates of the alkali metals, (b) freed of water-soluble materials, (c) brought to a pH of 8 to 9, and (d) dried.

3. A catalyst suitable for converting ethanol to butadiene which consists essentially of a mixture of silica and thorium oxide, said mixture containing 20% to 50% thorium oxide and having been (a) digested at a temperature of 60° C. to 125° C. in an aqueous solution of a strongly alkaline material from the group consisting of quaternary ammonium bases, the hydroxides of the alkali metals and the silicates of the alkali metals, (b) freed of water-soluble materials, (c) brought to a pH of 8 to 9, and (d) dried.

4. The process of preparing a catalyst suitable for converting ethanol to butadiene which comprises (a) preparing a mixture of 20% to 90% silica and 80% to 10% of an oxide from the group consisting of zirconium and thorium oxides, (b) heating said mixture at a temperature of at least 50° C. in an aqueous solution of a strongly alkaline material from the group consisting of quaternary ammonium bases, the hydroxides of the alkali metals and the silicates of the alkali metals, (c) washing water-soluble materials from said mixture, and (d) drying said mixture.

5. The process of preparing a catalyst suitable for converting ethanol to butadiene which comprises (a) preparing a mixture of 80% to 50% silica and 20% to 50% zirconium oxide, (b) heating said mixture at a temperature of 60° C. to 125° C. in an aqueous solution of a strongly alkaline material from the group consisting of quaternary ammonium bases, the hydroxides of the alkali metals and the silicates of the alkali metals, (c) washing water-soluble material from said mixture, and (d) drying said mixture.

6. The process of preparing a catalyst suitable for converting ethanol to butadiene which comprises (a) preparing a mixture of 80% to 50% silica and 20% to 50% thorium oxide, (b) heating said mixture at a temperature of 60° C. to 125° C. in an aqueous solution of a strongly alkaline material from the group consisting of quaternary ammonium bases, the hydroxides of the alkali metals and the silicates of the alkali metals, (c) washing water-soluble material from said mixture, and (d) drying said mixture.

LE ROY U. SPENCE,
DARREL J. BUTTERBAUGH.
DONALD G. KUNDIGER.

REFERENCES CITED

The following references are of record in the file of this patent:

UNITED STATES PATENTS

| Number | Name | Date |
|---|---|---|
| 2,308,792 | Thomas | Jan. 19, 1943 |
| 2,272,301 | Kinneberg et al. | Feb. 10, 1942 |
| 2,356,303 | Connolly | Aug. 22, 1944 |
| 2,382,239 | Lee | Aug. 14, 1945 |